March 28, 1961 J. A. C. HYDE 2,977,160
SUPPORT STRUCTURE FOR GAS TURBINE BEARINGS
Filed Dec. 22, 1958
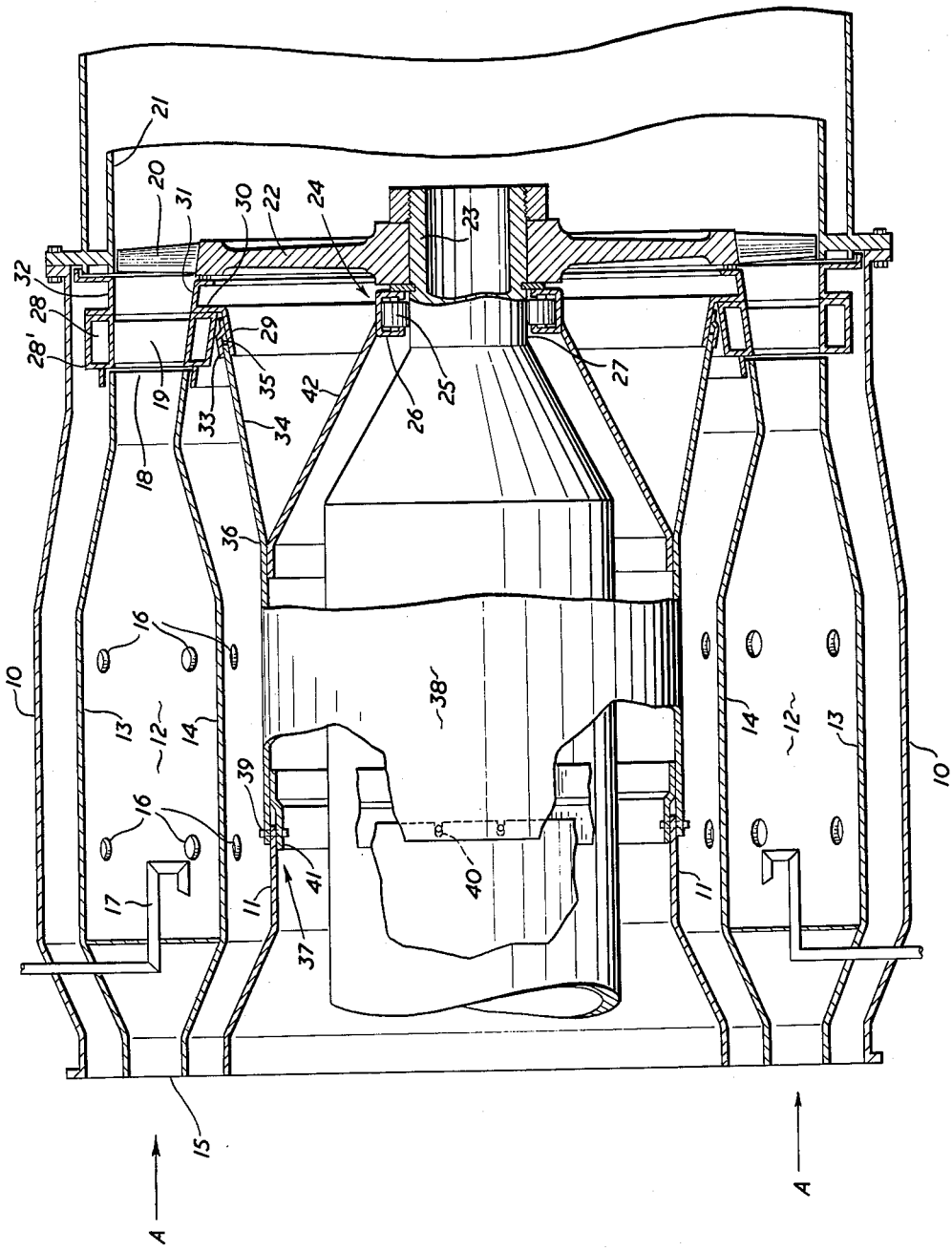
INVENTOR
J.A.C. HYDE
BY Maybee & Legris
ATTORNEYS

2,977,160

SUPPORT STRUCTURE FOR GAS TURBINE BEARINGS

John Alan Courtney Hyde, Derby, Littleover, England, assignor to Orenda Engines Limited, Malton Village, Ontario, Canada, a corporation Filed Dec. 22, 1958, Ser. No. 782,000

7 Claims. (Cl. 308—178)

This invention relates to structure for supporting one annular member coaxially within another annular member and, in particular, relates to structure for supporting a bearing in a gas turbine engine for the bearing to remain coaxial with the outer structure of the engine during temperature changes and thermal expansion which takes place in such an engine.

One of the basic problems in gas turbine engine design is the provision of supports for the main shaft bearings of an engine which supports will maintain the bearing coaxial with the outer casing in spite of the large and varying differential thermal expansions experienced by the structure in the engine. These problems become particularly acute when the rear bearing of a gas turbine engine is involved which, in most designs, must be supported by structure which extends through the annulus of hot gases issuing from the combustion chamber. The problem is made even greater due to the fact that there is a rather steep temperature gradient from the axis of the shaft to the outer casing and is still further complicated by the fact that when the engine is ignited from the "cold" condition, certain portions of the structure rise very rapidly in temperature while others rise relatively slowly and to a lesser maximum temperature. A still further complication arises in that some of the members influenced by this temperature rise are annular, and, as a result, when they expand they move radially outwardly of the engine whereas other members are linear members fixedly secured at their radially outer ends to the outer engine casing and, accordingly, when they expand their ends or structure mounted on their ends moves radially inwardly of the engine due to the increased length in the members themselves. Accordingly, the likelihood of there being relative movement between two parts in such a location is extremely great. This relative movement is, at some times, relatively large and, at other times, may be almost insignificant due to the compensation which often arises between one annular member moving radially outwardly and a linear member moving radially inwardly. Accordingly, the problem of supporting a bearing in such an environment for the bearing to remain coaxial with the outer casing is a difficult problem and one which has defied an entirely satisfactory solution for some time.

It is an object of the present invention to provide a bearing support structure which will minimize the difficulties which have been encountered in the past and which will provide for a bearing support which will maintain the bearing in coaxial position with respect to the outer casing within very fine tolerances.

The preferred embodiment of the invention is illustrated more or less diagrammatically in the accompanying drawing in which:

The single figure shows an axial section taken through a portion of a gas turbine engine.

In the drawing a portion of a gas turbine engine is illustrated, the portion being that which embodies the combustion chamber and the turbine of the engine. As is commonly kown in the art, the portion of the engine illustrated in the drawing will be preceded, to the left in the drawing, by an air inlet and an air compressor and will be succeeded, to the right in the drawing, by a tailpipe and an exhaust duct.

Although the invention is applicable to bearing supports in other locations in the engine and, indeed, is capable of general application outside the gas turbine art it will be appreciated that the following detailed description has been selected as illustrative of the invention since the problems which the present invention is primarily adapted to overcome are found in their acute condition in this environment.

Before proceeding with the detailed description it is to be understood that in this specification and in the claims the term "axially" is intended to be construed as defining a direction which extends parallel to the axis of rotation of the compressor and turbine of the engine and that the term "radially" is intended to be construed as radially of this axis. The terms "upstream" and "downstream" are used to identify the sense of the axial direction having regard to the direction of air flow through the engine which, in the drawings, is from left to right or, in other words, in the direction of the arrows A in the drawing.

Referring now to the drawing in detail the portion of the engine embodying the invention will be seen to comprise an outer casing 10 and an inner casing 11 both of which are substantially tubular and which define between them an annular space which houses an annular combustion chamber 12 which comprises an outer wall 13 and an inner wall 14. Air from the compressor (not shown) may enter the combustion chamber 12 through opening 15 at its upstream end and, in addition, through apertures 16 provided in its outer and inner walls. Fuel is admitted to the combustion chamber through conduit 17 and the fuel/air mixture is burned in the combustion chamber 12, the products of combustion passing outwardly from the combustion chamber through its downstream end 18 to flow past nozzle guide vanes 19 and turbine rotor blades 20 before passing outwardly to the rear of the engine through the exhaust duct 21.

The turbine rotor blades 20 are mounted on the periphery of a rotor disc 22 which, in turn, is rigidly secured to a shaft 23 which extends axially of the engine and which, in the embodiment illustrated, is a hollow tubular shaft supported at its after end by a roller bearing indicated generally by the reference character 24. The bearing 24 comprises a plurality of rollers 25 which run in an outer race 26 and which run directly on the external surface 27 of the shaft 23.

The outer race 26 of the bearing 24 will, in the remainder of this specification, and in the claims, be identified as the "second annular member" and it is this second annular member which it is desired to maintain in concentric relationship with a "first annulus" which constitutes generally the nozzle guide vanes 19 and their associated mounting and supporting structure.

The nozzle guide vanes 19 are radially disposed with respect to the axis of the engine and lie in a circumferential row immediately downstream of the downstream end 18 of the combustion chamber 12. Each nozzle guide vane 19 is rigidly secured at its radially outer end to supporting structure 28 mounted on the outer casing 10 of the engine. The structure 28 is shown only schematically in the drawings accompanying this application since many suitable forms of this structure are well known in the art. It is only essential, for the purposes of this invention, that the nozzle guide vanes be fixed against axial displacement relative to the engine as a whole and that they be fixed against sliding radial movement relative to the outer casing 10. At the radially inner end of the nozzle guide vanes 19 there is provided a conical flange 29 which has a radially outer surface which is the frustum of a cone, the base of the cone being defined by the radially inner surface of the nozzle guide vanes 19 and the axis of which is the axis of the engine. The conical flange 29 is provided, at its downstream end, with a radially outwardly extending portion 30 which is secured to the radially inner ends of the nozzle guide vanes 19 and this portion 30 is provided, at its radially outer edge, with a substantially axially extending portion 31 which constitutes an annular portion which, in conjunction with portion 32 of the mounting structure 28 associated with the nozzle guide vanes 19, defines an annular flow passage from the nozzle guide vanes 19 to the turbine rotor blades 20.

Secured to the radially outer surface of the frusto-conical flange 29 is a second frusto-conical flange 33 which is spaced from flange 29 to define an annular space 35 therebetween having parallel frusto-conical walls. A conical member 34 is positioned with its larger end extending into this annular space 35 and extends inwardly and axially of the flange 29 in an upstream direction. At point 36 the conical member 34 assumes cylindrical form and extends further upstream of the engine until it lies in overlapping telescopic relationship with the inner casing 11 as seen at point 37. The cylindrical member 38 is provided with a plurality of pins 39 extending in a radially inward direction which pins engage in notches 40 cut in the downstream end of casing 11 so that rotation of the cylindrical portion 38 and conical member 34 is prevented. A second substantially cylindrical member 41 is secured to the internal surface of cylindrical member 38 adjacent the upstream end thereof, the member 41 being of smaller diameter than the member 38 so that its external surface lies in contact with the internal surface of the inner casing 11 as may be seen at point 37.

The bearing 24 is supported from the conical member 34 by means of a conical web 42 which, at its end of smallest diameter is secured to the second annular member (the bearing) 26 by means such as brazing or welding. At its end of larger diameter it is secured to the members 34 and 38 at point 36 by means such as brazing, welding, riveting or other suitable means.

Having now described the structure embodying the present invention the mode of operation will now be discussed.

Let it be assumed first of all that the engine is in the "cold" condition, that is to say the entire engine is at the temperature of the ambient atmosphere. If the engine is now ignited a sudden flow of very hot gases will flow through the downstream end of the combustion chamber 12 and will pass over the nozzle guide vanes 19 which, as a result, will rise in temperature and will expand. If the nozzle guide vanes 19 are secured to structure which is a one-piece annular member then their expansion will result in overall radially outward movement of the frusto-conical flange 29. Since, however, the conical member 34 has not, at least at this stage, risen appreciably in temperature, it will not have expanded to the same degree as will the flange 29 which is in direct conductive contact with the nozzle guide vanes 19. Accordingly, although the frusto-conical flange 29 will tend to move radially outwardly, due to thermal expansion, the conical member 34 will experience no such tendency. Accordingly, as frusto-conical flange 29 moves radially outwardly it will cause the conical member 34 to move in an axially upstream direction with the inner surface of conical member 34 sliding over the external surface of frusto-conical flange 29. This axially upstream movement can be accommodated at point 37 by the telescopic relationship which exists between the cylindrical member 38 and the inner casing 11. At the same time the conical web 42 will be carried with the first conical member 34 and the cylindrical member 38 and will move the bearing 24 in an axially upstream direction along the shaft 23 but there will be no tendency and no forces exerted which will tend to move the bearing 24 or the second annular member 26 in a radial direction to disturb the coaxial relationship which exists between the first annulus and the second annular member.

Similarly, should contraction occur in the frusto-conical flange 29 and the associated spaced frusto-conical flange 33, the conical member 34 will slide over these surfaces in an axially downstream direction and will move the bearing axially of the shaft 23 in a downstream direction once again without any tendency to move it in a radial direction thereby disturbing the coaxial relationship which existed at the "cold" condition.

It will be seen that the structure embodying the present invention is based upon the fact that two conical surfaces which are in surface-to-surface contact with one another can slide one on the other due to relative expansion and contraction without destroying the coaxial relationship which exists between them. Hence, expansion and contraction in all the structure associated with the nozzle guide vanes 19 can merely produce relative sliding movement between the contacting surfaces of flanges 29 and 33 and the conical member 34 but this sliding movement will only be in an axial direction and cannot be in a radial direction and, accordingly, any expansion and contraction can only cause an axial shift in the bearing 24 and is incapable of producing a radial displacement which would destroy the coaxial relationship between the two parts.

In some of the following claims the invention is defined broadly as structure for maintaining two annuli in coaxial relationship.

The specification and detailed description of this invention is to be construed in such a manner that the outer race 26 or any associated structure to which the member 42 may be secured at its end of smaller diameter constitutes the second annular member. The nozzle guide vanes 19 and any structure associated with them constitute the first annulus, the frusto-conical flange 29 and the associated flange 33 constitute the surface which is the frustum of a cone, the base of which is defined by the first annulus and the axis of which is the axis of the first annulus. The conical member 34 is the conical member having an external and internal surface complementary to the radially outer surface of the frusto-conical surface; the means for maintaining the two conical surfaces in contact is constituted by the frusto-conical flange 33 but could, in addition, be embodied in resilient means which tend to urge the conical member 34 in a downstream direction. Such resilient means are not shown but their adaption and inclusion in this structure is intended to be contemplated by this invention.

The telescoping relationship between the cylindrical member 38 and the inner casing 11 serves to maintain the axis of the conical member co-linear with the axis of the first annulus and prevents any displacement of the axis of the conical member 34 from a position which is coincidental with the axis of the first annulus. This telescopic relationship also serves to maintain the second annular member normal to the axis of the first annular member so as to prevent binding of the sliding surfaces and to maintain axial alignment of the bearing 24.

The invention has been described in detail with reference to the accompanying drawing illustrating a preferred embodiment but the scope of the invention is intended to be construed within the limits of the appended claims.

What I claim as my invention is:

1. Structure for maintaining two annuli in coaxial relationship in a gas turbine engine comprising a first annulus fixed against axial displacement and forming a part of the engine casing, the first annulus carrying a flange which is the frustum of a cone the base of which is defined by the first annulus and the axis of which is the axis of the first annulus, a conical member having an internal and external surface complementary to the radially outer surface of the flange, the internal surface of the conical member being in contact with the outer frusto-conical surface of the flange and extending axially of the first annulus, means for maintaining the two conical surfaces in contact, means associated with the end of the conical member remote from the first annulus to maintain the axis of the conical member co-linear with the axis of the first annulus and means on the internal surface of the conical member to support a second annular member constituting a shaft bearing concentrically with the conical member and normal to the axis of the first annular member.

2. In a gas turbine engine, a first cylindrical member mounted, adjacent one end, for axial freedom and restrained from lateral and angular movement, and, at the other end, extending into an annulus, and carrying a bearing supported concentrically therewith from a point intermediate its ends, support means for maintaining the said other end and the bearing concentric with the annulus during thermal expansion and contraction of the annulus comprising a conical member extending radially and axially away from the said other end of the first cylindrical member, a second conical flange on the annulus and extending radially and axially towards the first member for the inner surface of the conical member to lie in surface-to-surface contact with the outer surface of the conical flange and means to maintain said surfaces in contact so that expansion or contraction of the annulus will cause the surfaces to slide one on another and to cause the first member and the bearing to move axially but not radially.

3. In a gas turbine engine, a first cylindrical member supported, at one end, by free telescoping engagement over a stationary cylinder and provided with means to prevent rotation of the first cylindrical member, the cylindrical member extending, at its other end, into an annulus and supporting a bearing concentrically therewith from a point intermediate its ends by means of a web secured, at one portion, to the interior surface of the cylindrical member and, at another portion, to the bearing, support means for maintaining the said other end and the bearing concentric with the annulus during thermal expansion and contraction of the annulus comprising a conical member extending radially and axially away from the said other end of the first member, a frusto-conical flange on the annulus and extending radially and axially towards the first member for the inner conical surface of the conical member to lie in surface-to-surface contact with the outer surface of the conical flange and means to maintain said surfaces in contact so that expansion or contraction of the annulus will cause the surfaces to slide one on another and to cause the first member and the bearing to move axially but not radially.

4. Structure as claimed in claim 3 in which the means to maintain the two conical surfaces in contact includes a further conical flange on the annulus and lying parallel to and closely spaced from the first conical flange to define a conical space between the two conical flanges into which extends the conical member.

5. In a gas turbine engine, a bearing, a first cylindrical member supporting the bearing adjacent one end and, at the other end, being supported by free telescoping engagement over a stationary cylinder, means on the stationary cylinder to prevent rotation of the cylindrical member, an outer casing surrounding the bearing, the cylindrical member and the stationary cylinder, an annulus supported by the casing and surrounding the said one end of the cylindrical member, means to support the said one end of the cylindrical member from the annulus for the bearing to remain concentric with the casing during thermal expansion of the annulus comprising a conical member extending radially and axially away from the said one end of the cylindrical member, a frusto-conical flange on the annulus and extending radially and axially towards the cylindrical member for the inner surface of the conical member on the cylindrical member to lie in surface-to-surface contact with the outer surface of the second flange and means to maintain said surfaces in contact so that expansion or contraction of the annulus will cause the surfaces to slide one on another and to cause the cylindrical member to move axially but not radially.

6. Structure as claimed in claim 5 in which the means to maintain the two conical surfaces in contact includes a further conical flange on the annulus and lying parallel to and closely spaced from the first conical flange to define a conical space between the two conical flanges into which extends the conical member.

7. In a gas turbine engine, an outer casing, a rotor and rotor blading carried by a shaft, a bearing journalling the shaft for rotation about its longitudinal axis, a circumferential row of nozzle guide vanes coaxial with the shaft and carried by the casing, means to support the bearing coaxially with the nozzle guide vanes comprising a flange carried by the nozzle guide vanes and having a surface which is the frustum of a cone, the axis of the cone being the axis of rotation of the shaft, a conical member having a surface complementary to the surface of the flange and in contact therewith, the conical member extending axially of the flange into telescopic engagement with a stationary sleeve within the engine, means to maintain the conical member in contact with the flange and web means extending from the conical member to support the bearing, the conical member, web means and the bearing being capable of axial movement upon expansion or contraction of the flange to convert radial displacement of the flange into axial displacement of the bearing.

References Cited in the file of this patent

UNITED STATES PATENTS

| | | |
|---|---|---|
| 2,591,399 | Buckland | Apr. 1, 1952 |
| 2,620,157 | Morley | Dec. 2, 1952 |
| 2,680,001 | Batt | June 1, 1954 |
| 2,829,014 | May | Apr. 1, 1958 |